(12) United States Patent
Salois et al.

(10) Patent No.: US 10,443,545 B2
(45) Date of Patent: Oct. 15, 2019

(54) REUSABLE HIGH PRESSURE AND HIGH TEMPERATURE ENERGETIC IGNITION SYSTEM

(71) Applicant: Goodrich Corproation, Charlotte, NC (US)

(72) Inventors: Matthew Salois, Berwick, ME (US); Brian Wilson, Vacaville, CA (US); Kevin Mueller, Dixon, CA (US)

(73) Assignee: Goodrich Corporation, Charlotte, NC (US)

( * ) Notice: Subject to any disclaimer, the term of this patent is extended or adjusted under 35 U.S.C. 154(b) by 363 days.

(21) Appl. No.: 15/426,861

(22) Filed: Feb. 7, 2017

(65) Prior Publication Data

US 2018/0223772 A1 Aug. 9, 2018

(51) Int. Cl.
- *F02K 9/94* (2006.01)
- *F02K 9/95* (2006.01)
- *F02K 9/96* (2006.01)

(52) U.S. Cl.
CPC .................. *F02K 9/94* (2013.01); *F02K 9/95* (2013.01); *F02K 9/96* (2013.01); *F05D 2260/83* (2013.01)

(58) Field of Classification Search
CPC .... F02K 9/38; F02K 9/72; F02K 9/94; A61M 5/30
USPC ................................... 361/247; 604/251–257
See application file for complete search history.

(56) References Cited

U.S. PATENT DOCUMENTS

| | | | |
|---|---|---|---|
| 2,493,725 A | 1/1950 | McMorris | |
| 2,934,014 A | 4/1960 | Smith | |
| 3,988,989 A | 11/1976 | Shea | |
| 4,374,605 A | 2/1983 | Aktiebolaget | |
| 4,378,674 A | 4/1983 | Bell | |
| 4,856,433 A * | 8/1989 | Evans | F41A 19/56 102/530 |
| 5,579,636 A * | 12/1996 | Rosenfield | F02K 9/38 60/251 |
| 5,715,675 A * | 2/1998 | Smith | F02K 9/72 60/251 |
| 6,016,652 A * | 1/2000 | Smith | F02K 9/72 60/251 |
| 2002/0169412 A1* | 11/2002 | Haar | A61M 5/30 604/70 |
| 2004/0162517 A1* | 8/2004 | Furst | A61M 5/2046 604/69 |
| 2013/0255223 A1* | 10/2013 | Brady | F02K 9/72 60/225 |

OTHER PUBLICATIONS

European Patent Office, European Search Report dated Sep. 20, 2018 in Application No. 18155450.2-1007.

* cited by examiner

*Primary Examiner* — Tuan T Dinh

(74) *Attorney, Agent, or Firm* — Snell & Wilmer, L.L.P.

(57) ABSTRACT

An energetic ignition arrangement may comprise a pressure vessel arrangement, comprising a pressure vessel, and an ignition system arrangement. The ignition system arrangement may comprise an ignitor housing coupled to the pressure vessel and defining a sealing aperture, a seal disposed in the sealing aperture, and an electric match extending through the ignitor housing, wherein at least the ignitor housing and the pressure vessel are reusable after the energetic ignition arrangement has been employed in an ignition event.

16 Claims, 5 Drawing Sheets

REUSABLE HIGH PRESSURE AND HIGH TEMPERATURE ENERGETIC IGNITION SYSTEM

FIELD

The present disclosure relates generally to energetic systems, and more particularly, to a reusable system for energetics.

BACKGROUND

Energetic systems may be used for various applications which use explosive energy to achieve a desired result. Testing and operating of energetic assemblies (rocket motors, test vessels, thrusters, actuators, etc.) use various samples of production hardware built, due to the inability to re-use ignition source and energetic materials. Ignition systems for pressure vessels may be entirely replaced after use due to the nature of the ignition system and ignition of the energetic therein.

SUMMARY

An energetic ignition arrangement is disclosed herein, in accordance with various embodiments. An energetic ignition arrangement may comprise a pressure vessel arrangement, comprising a pressure vessel, and an ignition system arrangement. The ignition system arrangement may comprise an ignitor housing coupled to the pressure vessel and defining a sealing aperture, a seal disposed in the sealing aperture, and an electric match extending through the ignitor housing, wherein at least the ignitor housing and the pressure vessel are reusable after the energetic ignition arrangement has been employed in an ignition event.

In various embodiments, the electric match may extend through the seal. The electric match may comprise a heating element, an energetic compound coupled to the heating element, and at least one wire lead coupled to the heating element configured to supply electric power to the heating element. The seal may hermetically seal to the ignitor housing and to the at least one wire lead. The energetic ignition arrangement may further comprise a first ceramic isolator and a second ceramic isolator, wherein the first ceramic isolator and the second ceramic isolator electrically insulate the at least one wire lead, and wherein the seal is located between the first ceramic isolator and the second ceramic isolator. The pressure vessel may define a cavity within which the electric match is positionable. The electric match may be configured to ignite an energetic disposed in the cavity. The seal may comprise a polymeric material and the first ceramic isolator and the second ceramic isolator may comprise a ceramic material. At least one of the seal, the first ceramic isolator, and the second ceramic isolator may be reusable after the energetic ignition arrangement has been employed in the ignition event. The ignition system arrangement may further comprise a jam nut threadably coupled to the ignitor housing, and a follower disposed between the jam nut and the seal, wherein the seal is configured to be compressed between the follower and the ignitor housing in response to the jam nut being rotated relative to the ignitor housing.

An energetic ignition arrangement is disclosed herein. An energetic ignition arrangement may comprise a pressure vessel arrangement, comprising an ignitor pressure vessel defining an energetic cavity, a propellant pressure vessel defining a propellant cavity, wherein the ignitor pressure vessel is coupled to the propellant pressure vessel, an energetic disposed in the energetic cavity, and a propellant disposed in the propellant pressure vessel, and an ignition system arrangement. The ignition system arrangement may comprise an ignitor housing coupled to the ignitor pressure vessel and defining a sealing aperture, a seal disposed in the sealing aperture configured to hermetically seals the ignitor housing, and an electric match extending through the ignitor housing, wherein at least the ignitor housing and the ignitor pressure vessel are reusable after the energetic ignition arrangement has been employed in an ignition event.

In various embodiments, the electric match may extend through the seal. The electric match may comprise a heating element, an energetic compound coupled to the heating element, and at least one wire lead coupled to the heating element configured to supply electric power to the heating element. The energetic ignition arrangement may further comprise a first ceramic isolator and a second ceramic isolator, wherein the first ceramic isolator and the second ceramic isolator electrically insulate the at least one wire, and wherein the seal is located between the first ceramic isolator and the second ceramic isolator. The ignition event may comprise the electric match igniting the energetic and the energetic igniting the propellant in response to the electric match igniting the energetic. The seal may comprise a polymeric material and the first ceramic isolator and the second ceramic isolator may comprise a ceramic material. At least one of the seal, the first ceramic isolator, and the second ceramic isolator may be reusable after the energetic ignition arrangement has been employed in the ignition event. The ignition system arrangement may further comprise a jam nut coupled to the ignitor housing, and a follower disposed between the jam nut and the seal, wherein the seal is configured to be compressed between the follower and the ignitor housing in response to the jam nut being tightened.

A method of operating an energetic ignition arrangement is disclosed. The energetic ignition arrangement may comprise a pressure vessel arrangement comprising a pressure vessel, and an ignition system arrangement comprising an ignitor housing coupled to the pressure vessel and defining a sealing aperture, a seal disposed in the sealing aperture, and an electric match extending through the ignitor housing The method may comprise initiating a first ignition event at a first time, comprising igniting the electric match, and igniting, by the electric match, an energetic, replacing the electric match with a second electric match, initiating a second ignition event at a second time, comprising igniting the second electric match, and igniting, by the second electric match, a second energetic.

In various embodiments, the pressure vessel, the ignitor housing, and the seal may be used during the first ignition event and the second ignition event.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As disclosed herein, an energetic ignition arrangement may comprise an electric match for igniting an energetic. The energetic ignition arrangement may be used for testing of various energetics. In this regard, it may be desirable to use energetic ignition arrangements various instances over a period of time. An ignition event may be initiated by igniting an electric match whereby the energetic is ignited. Various characteristics of the energetic may be the focus of testing or the energetic may be used to ignite an additional energetic such as a propellant, for example. In this regard, the energetic, the propellant, or the housings thereof may be tested during the ignition event. Furthermore, arrangements, as disclosed herein, may be for normal operation and are not limited to test systems.

In various embodiments, an electric match may be a single-use item. In this regard, after an ignition event is complete, the electric match may be replaced with an additional electric match. The energetic may also be replaced, as well as the propellant. A seal is provided to hermetically seal an ignitor housing wherein the seal, as well as a portion of the electric match is disposed. In various embodiments, a first ceramic isolator and/or a second ceramic isolator. However, the seal may undergo several ignition events before being replaced. Replacement of the seal may be decided upon inspection of the seal. In this manner, an energetic ignition arrangement, as disclosed herein comprises a re-usable system. Energetic ignition arrangements, as disclosed herein, may provide a low cost testing system. Energetic ignition arrangements, as disclosed herein, may provide a testing system capable of quick, simple, and/or repeatable use.

Figure 1:
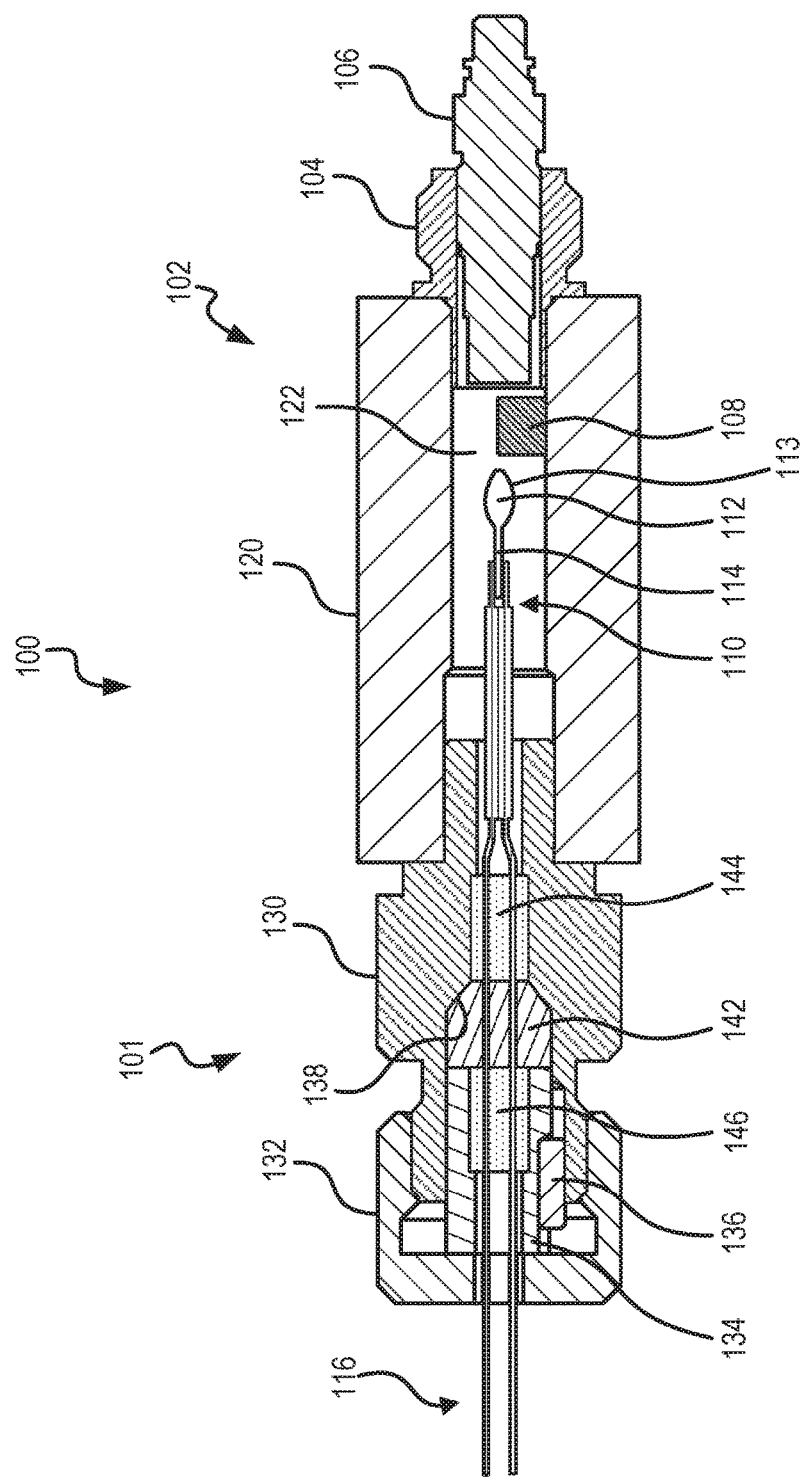
- FIG. 1 illustrates a cross section view of an energetic ignition arrangement, in accordance with various embodiments.

With reference to FIG. 1, an energetic ignition arrangement 100 is depicted, in accordance with various embodiments. Energetic ignition arrangement 100 may include a pressure vessel arrangement 102. Pressure vessel arrangement 102 may comprise a pressure vessel 120. Pressure vessel 120 may define a cavity (also referred to herein as an energetic cavity) 122. An energetic 108 may be disposed in energetic cavity 122.

In various embodiments, an energetic may comprise an explosive, a pyrotechnic composition, a propellant, a fuel, or the like. For example, energetic 108 may comprise a metal-oxidizer such as boron potassium nitrate ($BKNO_3$). However, energetic 108 may comprise any suitable pyrotechnic composition, including metal hydride-oxidizers. Energetic 108 may comprise an ignitor. In this regard, energetic 108 may be used primarily to ignite other, more difficult to ignite materials (e.g., solid-fuel propellants).

In various embodiments, pressure vessel arrangement 102 may comprise a fitting 104 coupled to pressure vessel 120. In various embodiments, fitting 104 may be detachably coupled to pressure vessel 120. However, in various embodiments, fitting 104 and pressure vessel 120 may comprise a single, unitary member. Pressure vessel arrangement 102 may comprise a pressure sensor 106. Pressure sensor 106 may detect a pressure within energetic cavity 122. For example, pressure sensor 106 may measure an increase in pressure within cavity 122 in response to energetic 108 being ignited. In this regard, various characteristics of energetic 108 may be characterized and/or tested including burn time, pressure, etc.

Energetic ignition arrangement 100 may include an ignition system arrangement 101. Ignition system arrangement 101 may comprise ignitor housing 130. Ignitor housing 130 may define an aperture (also referred to herein as a sealing aperture) 138. Sealing aperture 138 may extend through ignitor housing 130 to create a hollow bore. A seal 142 may be disposed within and seated against sealing aperture 138 to hermetically seal ignitor housing 130. Ignitor housing 130 may be coupled to pressure vessel 120. In this regard, energetic cavity 122 may be hermetically sealed via seal 142. A first ceramic isolator 144 and a second ceramic isolator 146 may be disposed within sealing aperture 138. In various embodiments, seal 142 may be located between first ceramic isolator 144 and second ceramic isolator 146. Seal 142 may comprise a polymeric material, such as a fluoroelastomer polymer for example, for high temperature usage. Seal 142 may comprise a polytetrafluoroethylene (PTFE). First ceramic isolator 144 and second ceramic isolator 146 may comprise a ceramic material. First ceramic isolator 144 and second ceramic isolator 146 may comprise porcelain, or any other electrically isolating material. First ceramic isolator 144 and second ceramic isolator 146 may comprise a high temperature, high pressure ceramic. First ceramic isolator 144 and second ceramic isolator 146 may comprise a high temperature ceramic such as an early transition metal boride, carbide, and/or nitride, such as hafnium nitride (HfN), zirconium nitride (ZrN), titanium carbide (TiC), titanium nitride (TiN), thorium dioxide ($ThO_2$), and/or tantalum carbide (TaC), for example.

Ignition system arrangement 101 may comprise a jam nut 132 coupled to ignitor housing 130. In various embodiments, jam nut 132 may be threadingly coupled to ignitor housing 130. A follower 134 may be disposed between jam nut 132 and seal 142. Follower 134 may comprise a hollow sleeve. Follower 134 may be disposed in sealing aperture 138. Seal 142 may be configured to be compressed between follower 134 and ignitor housing 130 in response to jam nut 132 being tightened. Stated differently, seal 142 may be configured to be compressed between follower 134 and ignitor housing 130 in response to jam nut 132 being rotated relative to ignitor housing 130. An alignment pin 136 may be coupled between follower 134 and ignitor housing 130. Alignment pin 136 may prevent follower 134 from spinning in response to jam nut 132 being tightened. In this regard, alignment pin 136 may prevent seal 140 from spinning in response to jam nut 132 being tightened. In this regard, alignment pin 136 may prevent electric match 110 from spinning in response to jam nut 132 being tightened, which may prevent wire leads 116 from being tangled.

Ignition system arrangement 101 may house an ignitor. In various embodiments, ignition system arrangement 101 houses electric match 110. Electric match 110 may comprise an ignitor whereby an electric current is transformed into heat, which ignites an energetic compound. Electric match 110 may comprise wire leads 116 coupled to a heating element 114. An electric match head 112 may be coupled to heating element 114. Electric match head 112 may comprise the energetic compound 113 configured to ignite in response to heat from heating element 114. Electric match 110 may extend through ignitor housing 130. Electric match 110 may be positionable within energetic cavity 122. Electric match 110 may extend into energetic cavity 122. Electric match 110 may extend through seal 140. In various embodiments, wire leads 116 may extend through seal 142, first ceramic isolator 144, and second ceramic isolator 146. First ceramic isolator 144 and second ceramic isolator 146 may electrically isolate wire leads 116 from adjacent components of ignition system arrangement 101. Wire leads 116 may be sealed via seal 142. Stated differently, seal 142 may hermetically seal to wire leads 116. Electric match head 112 may be in close proximity to energetic 108 such that ignition of electric match head 112 ignites energetic 108.

Figure 2:
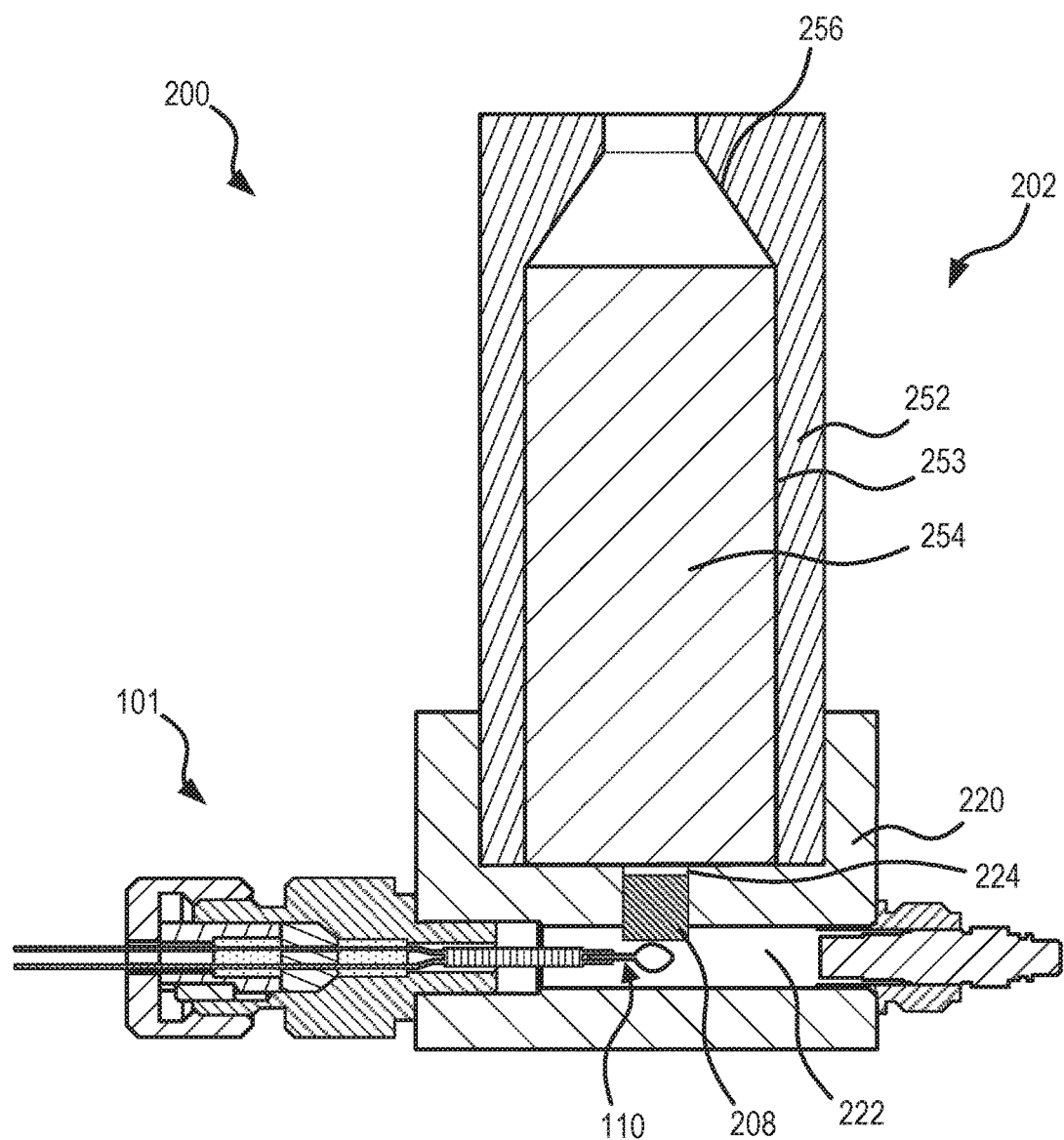
FIG. 2 illustrates a cross section view of an energetic ignition arrangement coupled to a pressure vessel arrangement having a propellant, in accordance with various embodiments.

With respect to FIG. 2, elements with like element numbering, as depicted in FIG. 1, are intended to be the same and will not necessarily be repeated for the sake of clarity.

With reference to FIG. 2, an energetic ignition arrangement 200 is illustrated, in accordance with various embodiments. Energetic ignition arrangement 200 may comprise ignition system arrangement 101. Energetic ignition arrangement 200 may comprise pressure vessel arrangement 202. Pressure vessel arrangement 202 may be coupled to ignition system arrangement 101. Pressure vessel arrangement 202 may comprise pressure vessel (also referred to herein as ignitor pressure vessel) 220. Ignitor pressure vessel 220 may define energetic cavity 222. Electric match 110 may extend into energetic cavity 222. Pressure vessel arrangement 202 may comprise propellant pressure vessel 252. Propellant pressure vessel 252 may define cavity (also referred to herein as a propellant cavity) 253. A propellant 254 may be disposed in propellant cavity 253. In various embodiments, propellant 254 may comprise a solid fuel. An orifice 224 may be disposed in ignitor pressure vessel 220. Ignitor pressure vessel 220 may be coupled to propellant pressure vessel 252. Energetic cavity 222 may be in fluid communication with propellant cavity 253 via orifice 224. In this regard, electric match 110 may ignite and energetic 208 may ignite in response thereto. Energetic 208 may then ignite propellant 254.

In various embodiments, propellant 254 may define a nozzle 256 through which propellant 254 exhausts. In this regard, various characteristics of propellant 254 may be characterized and/or tested including burn time, pressure, thrust, etc.

In various embodiments, pressure vessel arrangement 202 may comprise a rocket motor. However, it is contemplated herein that ignition system arrangement 101 may be used for various other applications, including thrusters, pistons, actuators, or any other system which uses pressure.

Figure 3:
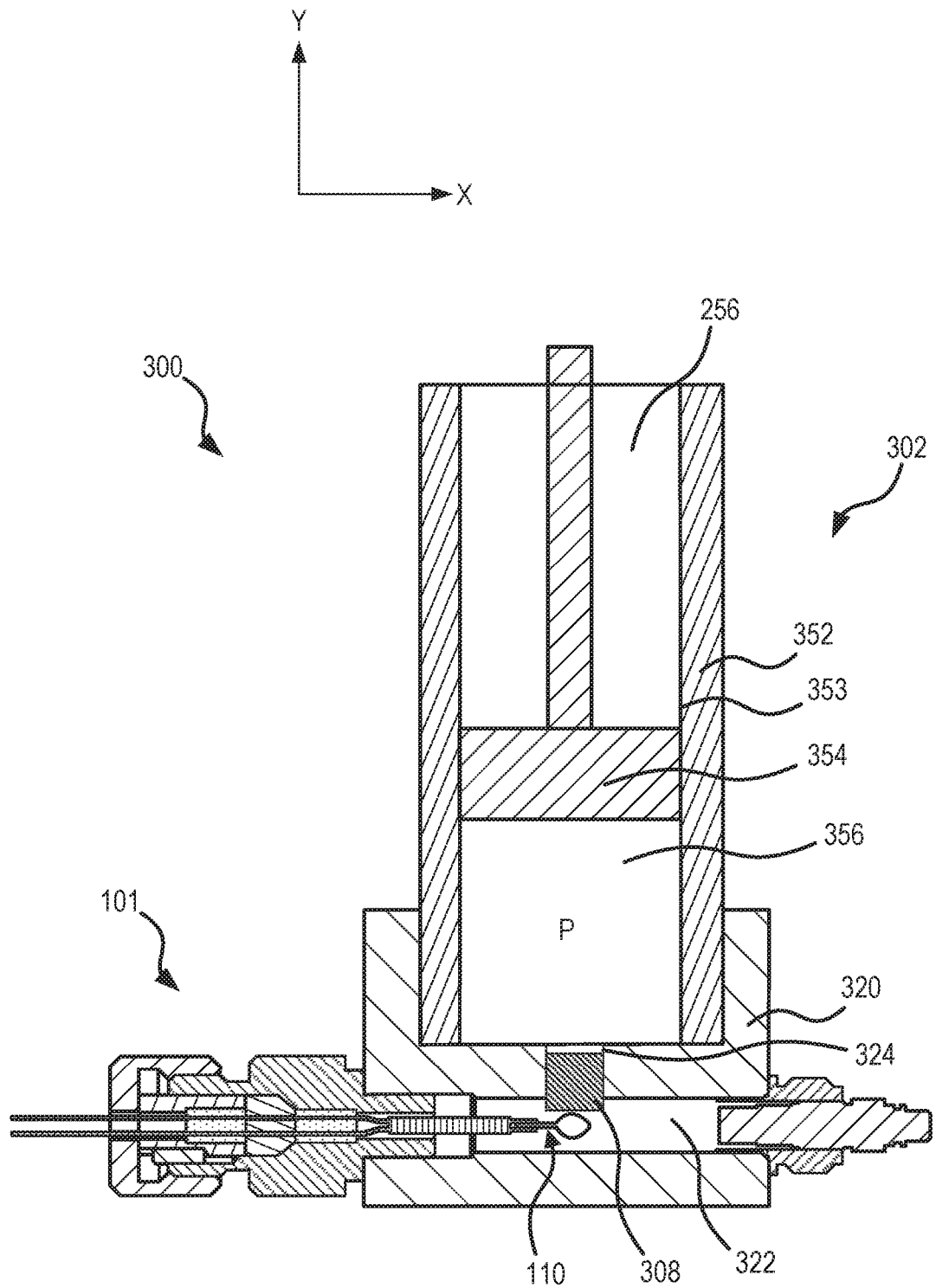
FIG. 3 illustrates a cross section view of an energetic ignition arrangement coupled to a pressure vessel arrangement having a piston, in accordance with various embodiments.

With reference to FIG. 3, an energetic ignition arrangement 300 is illustrated, in accordance with various embodiments. Xy-axes are provided for ease of illustration. Energetic ignition arrangement 300 may comprise ignition system arrangement 101. Energetic ignition arrangement 300 may comprise pressure vessel arrangement 302. Pressure vessel arrangement 302 may be coupled to ignition system arrangement 101. Pressure vessel arrangement 302 may comprise pressure vessel (also referred to herein as ignitor pressure vessel) 320. Ignitor pressure vessel 320 may define energetic cavity 322. Electric match 110 may extend into energetic cavity 322. Pressure vessel arrangement 302 may comprise pressure vessel 352. Pressure vessel 352 may define cavity (also referred to herein as a piston cavity) 353. A piston 354 may be disposed in piston cavity 353. In various embodiments, piston 354 may comprise a translatable piston configured to translate within piston cavity 353. An orifice 324 may be disposed in ignitor pressure vessel 320. Ignitor pressure vessel 320 may be coupled to pressure vessel 352. Energetic cavity 322 may be in fluid communication with piston cavity 353 via orifice 324. In this regard, electric match 110 may ignite and energetic 308 may ignite in response thereto. Energetic 308 may increase a pressure P within chamber 356 to cause piston 354 to actuate or translate in the positive y-direction.

Figure 4:
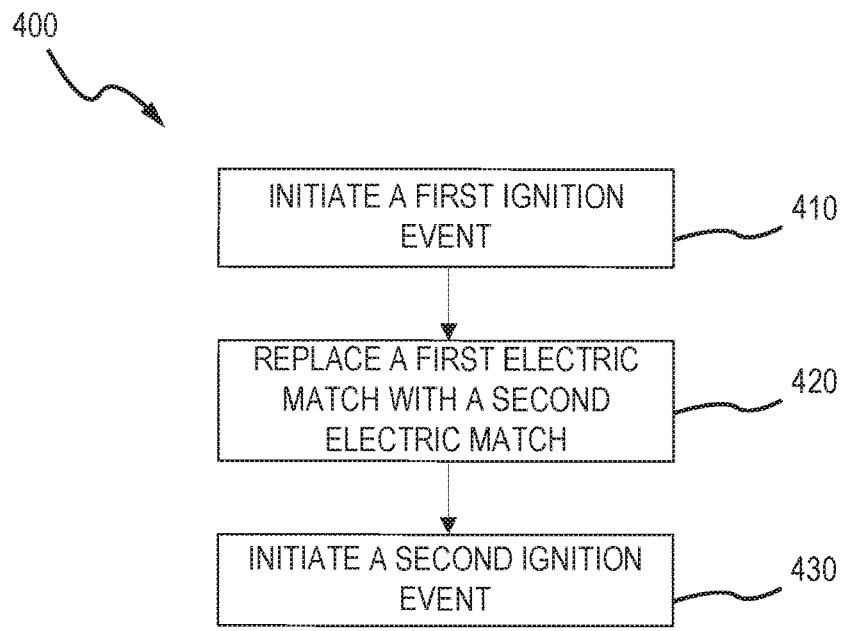
FIGS. 4, 5, and 6 illustrate methods of operating an energetic ignition arrangement, in accordance with various embodiments.

With reference to FIG. 4, a method 400 for operating an energetic ignition arrangement is depicted, in accordance with various embodiments. Method 400 includes initiating a first ignition event (step 410). Method 400 includes replacing a first electric match with a second electric match (step 420). Method 500 includes initiating a second ignition event (step 430).

With reference to FIG. 1, FIG. 2, and FIG. 4, step 410 may include supplying a current through wire leads 116 to ignite electric match 110 which ignites energetic 108 and/or energetic 208 in response thereto. Step 410 may occur at a first time. Step 420 may include replacing a first electric match (e.g., electric match 110) with a second electric match (e.g., with another electric match similar to electric match 110). Step 430 may comprise supplying a current through the second electric match 110 to initiate the second ignition event. In this regard, ignitor housing 130, pressure vessel 120, pressure vessel 220, first ceramic isolator 144, second ceramic isolator 146, and/or seal 142 may be reusable after the energetic ignition arrangement has been employed in an ignition event.

Figure 5:
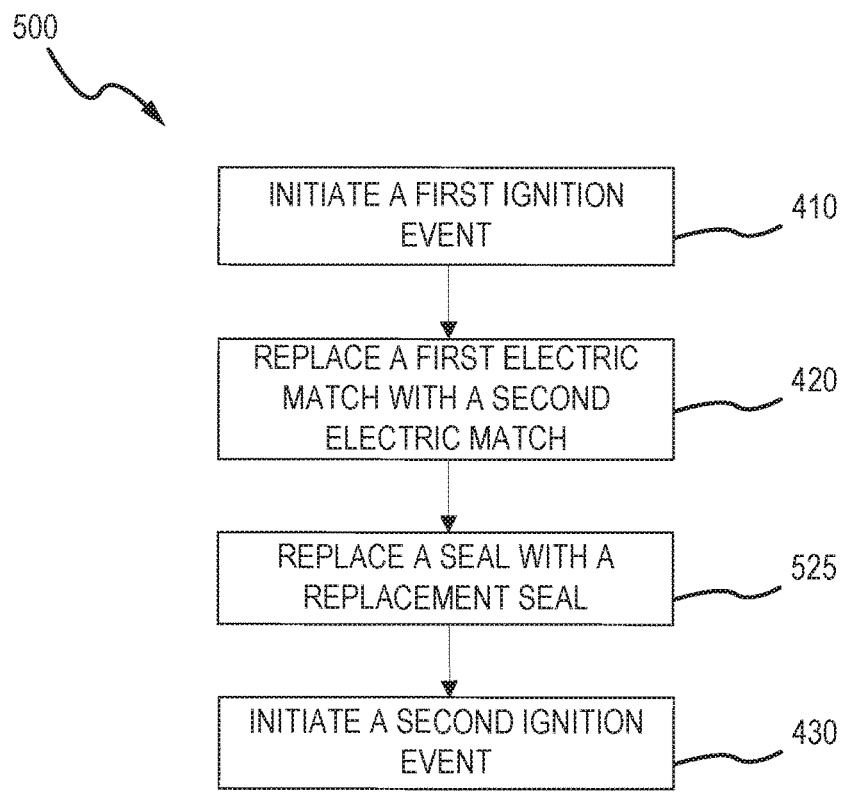

With respect to FIG. 5, elements with like element numbering, as depicted in FIG. 4, are intended to be the same and will not necessarily be repeated for the sake of clarity.

In various embodiments, upon inspection, it may be desirable to replace seal 142 with a replacement seal 142. In this regard, with reference to FIG. 5, a method 500 for operating an energetic ignition arrangement may include replacing a seal with a replacement seal (i.e., a replacement seal) (step 525). In this regard, the seal may comprise a replaceable seal.

Figure 6:
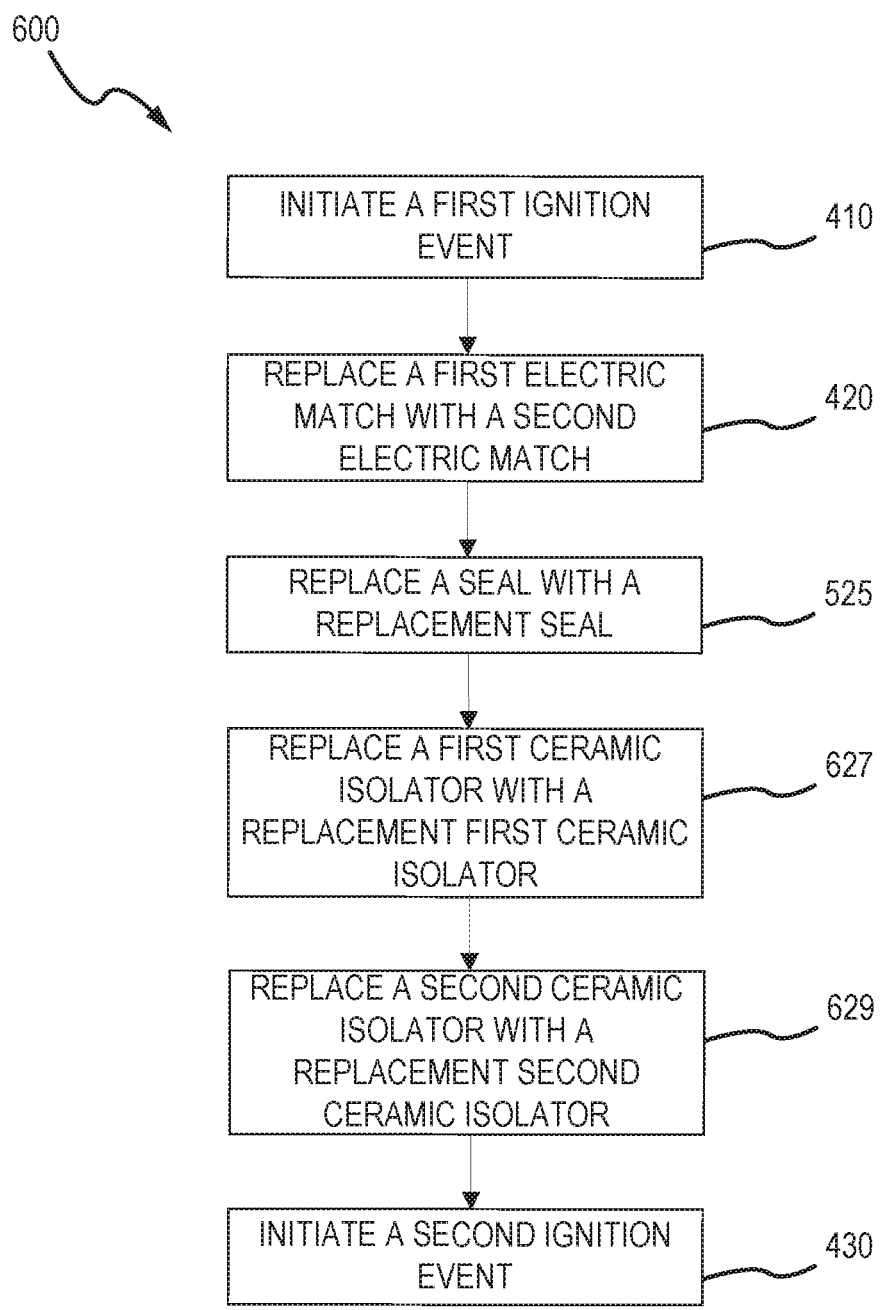

With respect to FIG. 6, elements with like element numbering, as depicted in FIG. 5, are intended to be the same and will not necessarily be repeated for the sake of clarity.

In various embodiments, upon inspection, it may be desirable to replace first ceramic isolator 144 and/or second ceramic isolator 146 with a replacement ceramic isolator. In this regard, with reference to FIG. 6, a method 600 for operating an energetic ignition arrangement may include replacing a first ceramic isolator with a replacement first ceramic isolator (step 627). Method 600 may further include replacing a second ceramic isolator with a replacement second ceramic isolator (step 629). In this regard, first ceramic isolator 144 and second ceramic isolator 146 may comprise replaceable ceramic isolators.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An energetic ignition arrangement, comprising:
a pressure vessel arrangement, comprising:
a pressure vessel; and
an ignition system arrangement, comprising:
an ignitor housing coupled to the pressure vessel and defining a sealing aperture; a seal disposed in the sealing aperture;
a first ceramic isolator:
a second ceramic isolator, wherein the seal is located between the first ceramic isolator and the second ceramic isolator: and
an electric match extending through the ignitor housing, wherein at least the ignitor housing and the pressure vessel are reusable after the energetic ignition arrangement has been employed in an ignition event;
wherein the electric match extends through the seal; and
wherein the electric match comprises: a heating element;
an energetic compound coupled to the heating element; and
at least one wire lead coupled to the heating element configured to supply electric power to the heating element.

2. The energetic ignition arrangement of claim 1, wherein the seal hermetically seals to the ignitor housing and to the at least one wire lead.

3. The energetic ignition arrangement of claim 1, wherein the first ceramic isolator and the second ceramic isolator electrically insulate the at least one wire lead.

4. The energetic ignition arrangement of claim 1, wherein the seal comprises a polymeric material and the first ceramic isolator and the second ceramic isolator comprise a ceramic material.

5. The energetic ignition arrangement of claim 1, wherein at least one of the seal, the first ceramic isolator, and the second ceramic isolator are reusable after the energetic ignition arrangement has been employed in the ignition event.

6. The energetic ignition arrangement of claim 1, wherein the ignition system arrangement further comprises:
a jam nut threadably coupled to the ignitor housing; and
a follower disposed between the jam nut and the seal,
wherein the seal is configured to be compressed between the follower and the ignitor housing in response to the jam nut being rotated relative to the ignitor housing.

7. The energetic ignition arrangement of claim 2, wherein the pressure vessel defines a cavity within which the electric match is positionable.

8. The energetic ignition arrangement of claim 7, wherein the electric match is configured to ignite an energetic disposed in the cavity.

9. An energetic ignition arrangement, comprising:
a pressure vessel arrangement, comprising:
an ignitor pressure vessel defining an energetic cavity;
a propellant pressure vessel defining a propellant cavity, wherein the ignitor pressure vessel is coupled to the propellant pressure vessel;
an energetic disposed in the energetic cavity; and
a propellant disposed in the propellant pressure vessel; and
an ignition system arrangement, comprising:
an ignitor housing coupled to the ignitor pressure vessel and defining a sealing aperture;
a seal disposed in the sealing aperture configured to hermetically seals the ignitor housing;

a first ceramic isolator:
a second ceramic isolator, wherein the seal is located between the first ceramic isolator and the second ceramic isolator: and
an electric match extending through the ignitor housing, wherein at least the ignitor housing and the ignitor pressure vessel are reusable after the energetic ignition arrangement has been employed in an ignition event;
wherein the electric match extends through the seal; and
wherein the electric match comprises: a heating element;
an energetic compound coupled to the heating element; and
at least one wire lead coupled to the heating element configured to supply electric power to the heating element.

10. The energetic ignition arrangement of claim 9, wherein the first ceramic isolator and the second ceramic isolator electrically insulate the at least one wire.

11. The energetic ignition arrangement of claim 9, wherein the ignition event comprises the electric match igniting the energetic and the energetic igniting the propellant in response to the electric match igniting the energetic.

12. The energetic ignition arrangement of claim 9, wherein the seal comprises a polymeric material and the first ceramic isolator and the second ceramic isolator comprise a ceramic material.

13. The energetic ignition arrangement of claim 9, wherein at least one of the seal, the first ceramic isolator, and the second ceramic isolator are reusable after the energetic ignition arrangement has been employed in the ignition event.

14. The energetic ignition arrangement of claim 10, wherein the ignition system arrangement further comprises:
a jam nut coupled to the ignitor housing; and a follower disposed between the jam nut and the seal,
wherein the seal is configured to be compressed between the follower and the ignitor housing in response to the jam nut being tightened.

15. A method of operating an energetic ignition arrangement, comprising:
a pressure vessel arrangement, comprising:
a pressure vessel; and
an ignition system arrangement, comprising:
an ignitor housing coupled to the pressure vessel and defining a sealing aperture;
a seal disposed in the sealing aperture;
a first ceramic isolator;
a second ceramic isolator, wherein the seal is located between the first ceramic isolator and the second ceramic isolator; and
an electric match extending through the ignitor housing;
wherein the electric match extends through the seal; and
wherein the electric match comprises: a heating element;
an energetic compound coupled to the heating element; and
at least one wire lead coupled to the heating element configured to supply electric power to the heating element,
the method comprising:
initiating a first ignition event at a first time, comprising:
igniting the electric match; and igniting, by the electric match, an energetic;
replacing the electric match with a second electric match;
initiating a second ignition event at a second time, comprising:
igniting the second electric match; and igniting, by the second electric match, a second energetic.

16. The method of claim 15, wherein the pressure vessel, the ignitor housing, and the seal are used during the first ignition event and the second ignition event.

* * * * *